(No Model.)

H. C. CARTER.
HORSE FLY NET AND COVER.

No. 567,078. Patented Sept. 1, 1896.

WITNESSES:
Paul Johot
Fred Acker

INVENTOR
H. C. Carter
BY
ATTORNEYS.

United States Patent Office.

HENRY C. CARTER, OF BELMONT, NEW YORK.

HORSE FLY-NET AND COVER.

SPECIFICATION forming part of Letters Patent No. 567,078, dated September 1, 1896.

Application filed March 27, 1896. Serial No. 585,080. (No model.)

*To all whom it may concern:*

Be it known that I, HENRY C. CARTER, of Belmont, in the county of Allegany and State of New York, have invented a new and useful Improvement in Horse Fly-Nets and Covers, of which the following is a full, clear, and exact description.

The object of this invention is to provide a superior fly-net for horses and other animals, and particularly one which may be conveniently attached to the harness of the animal, contradistinguished from being spread directly on the animal.

The invention consists in certain peculiar features of construction which will be fully described hereinafter and defined in the claims.

Reference is to be had to the accompanying drawings, forming a part of this specification, in which similar characters of reference indicate corresponding parts in all the figures.

Figure 1:
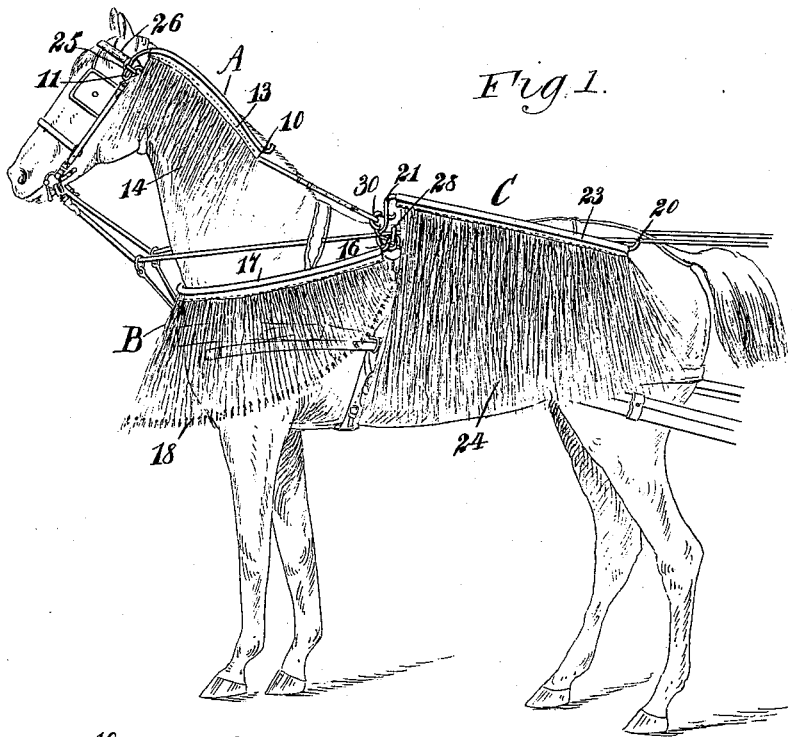
Figure 2:
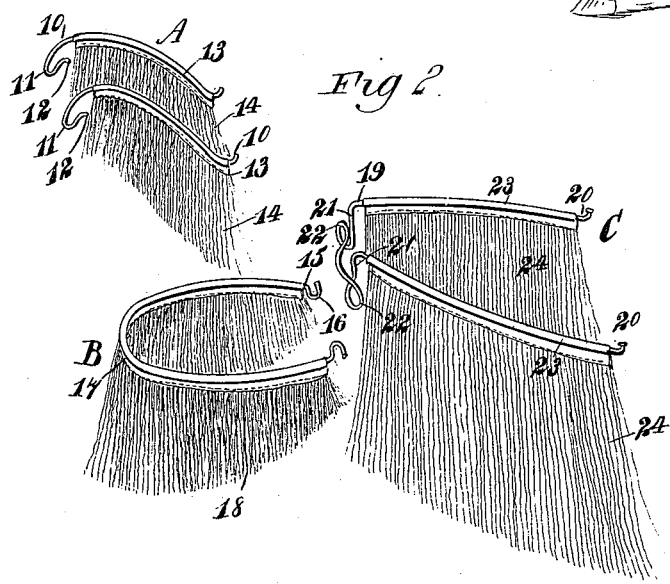
Figure 3:
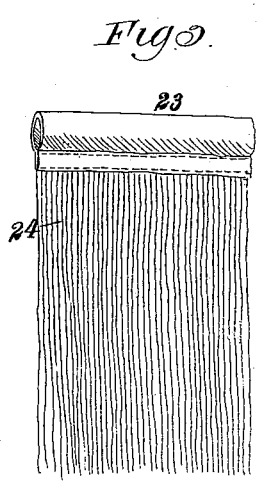

Figure 1 is a side elevation of a horse and a side elevation of the improved net applied to the harness of the horse. Fig. 2 is a detail perspective view of the various sections of the net. Fig. 3 is a detail perspective view of a portion of the net proper, illustrating the hem and attached or integral fringe; and Fig. 4 is a plan view of the saddle portion of a harness and a partial plan view of the frame of the breast-collar and back-pieces of the net, illustrating the manner in which these parts are attached to the saddle of the harness.

In carrying out the invention the net is made in sections, and the sections, when arranged upon the animal, are adapted to constitute as complete protection as an ordinary net made in one or two sections. The sections of the net preferably employed comprise a head-piece or bridle-section A, a breast-piece or collar B, and a back-piece C. The head or bridle piece A is to be located at each side of the neck of the animal, and each of these sections consists of a frame 10, ordinarily made from spring-wire of suitable size, which wire is bent upon itself to form a body portion curved to conform to the arch of the neck of the animal, and a front hook portion 11, having its extremity 12 curved downwardly parallel with the shorter member of the hook a predetermined distance. The netting, which consists of strips or a fringe 14, is secured to a body 13, provided with a hem, the body portion of the frame of a head-section 10 being passed through the aforesaid hem, as shown particularly in Fig. 2. That portion B of the net which is to protect the front portion and breast of the animal is in the shape of a horizontal collar, and its frame consists of a strip of wire 15, or other spring material, bent to a practically horseshoe shape, or being given a substantially similar curve, and at each extremity of the wire 15 forming the frame an outwardly-extending hook 16 is formed, or the equivalent of a hook. Under this construction a breast-collar is produced and the wire is passed through a hem 17, to which the fringe 18 or strips of material are either attached or made integral with the hem. Preferably the fringe or free pendent portion of the breast-collar is longest at the front and is gradually lessened in length as it approaches the rear of the frame.

Figure 4:
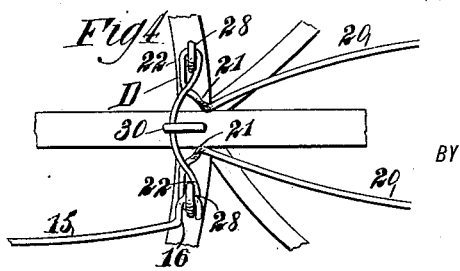

The back piece or frame C is also preferably made of wire or a like material, and comprises two diverging side members 20, which at their forward or converging ends are bent downward to form substantially vertical arms 21, as shown particularly in Fig. 2, and the wire of which this frame is made is then bent upon itself to form two loops 22, the connecting-bar of the loop being arched to pass over the saddle D of the harness in such a manner that the loops 22, as shown in Fig. 4, may be swung over the turrets or saddle-rings 28. The fringe or pendent strips 24, as in the other sections, are preferably attached to hems 23, an arm 20 being passed through each hem, so that the fringe of the back piece or frame C will hang down at each side of the flanks and rear body portions of the animal, as shown in Fig. 1.

A staple 25 is secured, preferably, to the rosette portion of the bridle 26. The hook or head portions 11 of the head-pieces A are pressed downward through the staples 25 of the rosette portion of the bridle 26, as shown in Fig. 1, and the frames of the head-pieces are thereby held away from the neck of the animal, while the fringe or netting may fall down at each side of the neck for the protection thereof.

The breast-piece or collar B is attached to the harness by causing the hooks 16 at the rear extremities of its frame to engage with the turrets 28 or eyes on the saddle D, as shown in Figs. 1 and 4; and since the extremities of the frame of the breast-collar will need to be drawn inward to enter the turrets of the saddle, the frame of the breast-collar B, and likewise the attached netting, will also be held free from engagement with the body of the animal, and when the back-piece C is passed over the turrets of the saddle in the manner above set forth the arms 20 of this frame will be held free from the back portion of the animal and will extend rearward beyond and over the flanks, permitting the fringe or netting 24 connected with these arms to fall downward, likewise free from the body of the animal. Under this construction of the net the air may circulate freely between the net and the body of the animal, keeping said animal cool, and the attachment to the harness may be expeditiously and conveniently accomplished, and in like manner the net may be removed from engagement with the harness.

I desire it to be distinctly understood that I do not confine myself to any material for the cover-fringe or netting proper or to any particular means for attaching the cover or netting to the frames of the sections, but a hem is preferably employed for this purpose, and Mexican grass has been found to be a very desirable material for the body portion of a net.

It is evident that as the horse moves the fringe or net portion will be agitated to a greater extent than when brought close to the body of the animal, and therefore insects will be more likely to become dislodged and prevented from approaching too closely to the horse's body or alighting upon it.

It is further evident that with but slight changes the netting or cover supports may be adapted for attachment to the shafts or pole of a vehicle, and I contemplate such application.

Having thus described my invention, I claim as new and desire to secure by Letters Patent—

1. In a horse fly-net, the combination, with the bridle provided with a socket, of a frame of spring material adapted to enter the socket of the bridle at one end, the body of the frame being curved downward and rearward, and a netting or cover secured to the said frame, whereby the netting or cover and frame will be held in spaced relation to the neck of the horse, as and for the purpose specified.

2. In a horse fly-net, a breast-collar arched to extend around the breast of the horse, the said collar comprising a frame of a spring material, and a netting or cover attached to the frame, the ends of the frame being adapted for engagement with a support, as the saddle portion of the harness, as and for the purpose specified.

3. In a horse fly-net, a back-section comprising a frame of spring material having diverging side portions, the converging ends whereof are connected by a bar integral with the side arms, loops being formed at each side of the connecting-bar, adapted to receive a portion of the harness-saddle, and a netting or cover attached to the said arms of the aforesaid frame, as and for the purpose specified.

4. A back-section for fly-nets, the back-section having two side portions capable of carrying the netting and extending along the side of the animal, the side portions being connected at the front ends by a transverse forward portion, such forward portion being capable of engaging the check-hook and turrets of the harness and of springing against the same to hold the entire back-section in place, substantially as described.

HENRY C. CARTER.

Witnesses:
FRANK WINDUS,
W. H. WINDUS.